F. J. TILLMAN.
CALCULATING ATTACHMENT FOR TYPE WRITING MACHINES.
APPLICATION FILED AUG. 3, 1910.
1,003,671.
Patented Sept. 19, 1911.
6 SHEETS—SHEET 1.
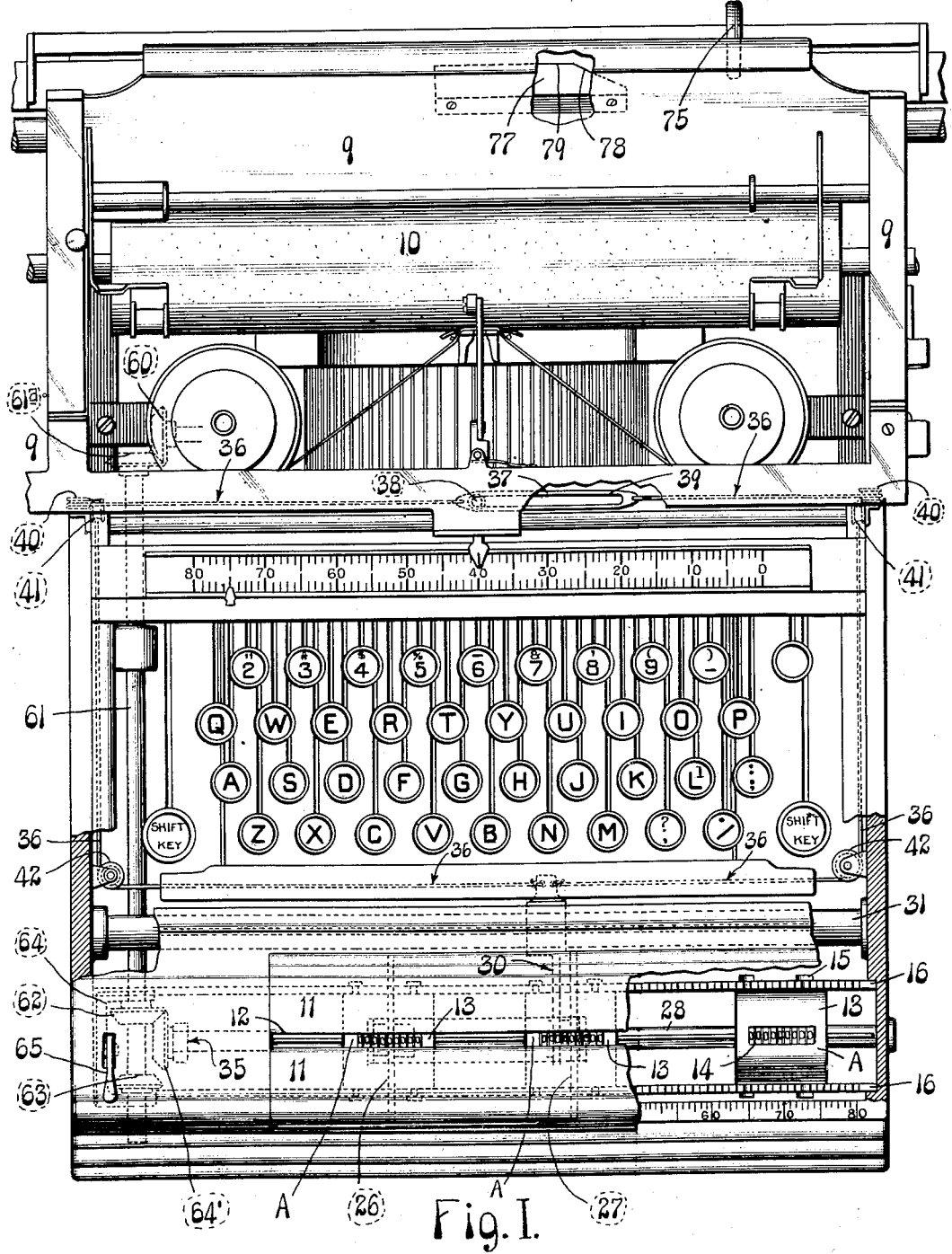
Fig. I.
Attest
A. J. McCauley
E. B. Pinner
Inventor:
F. J. Tillman
by E. O. Knight Att'y.

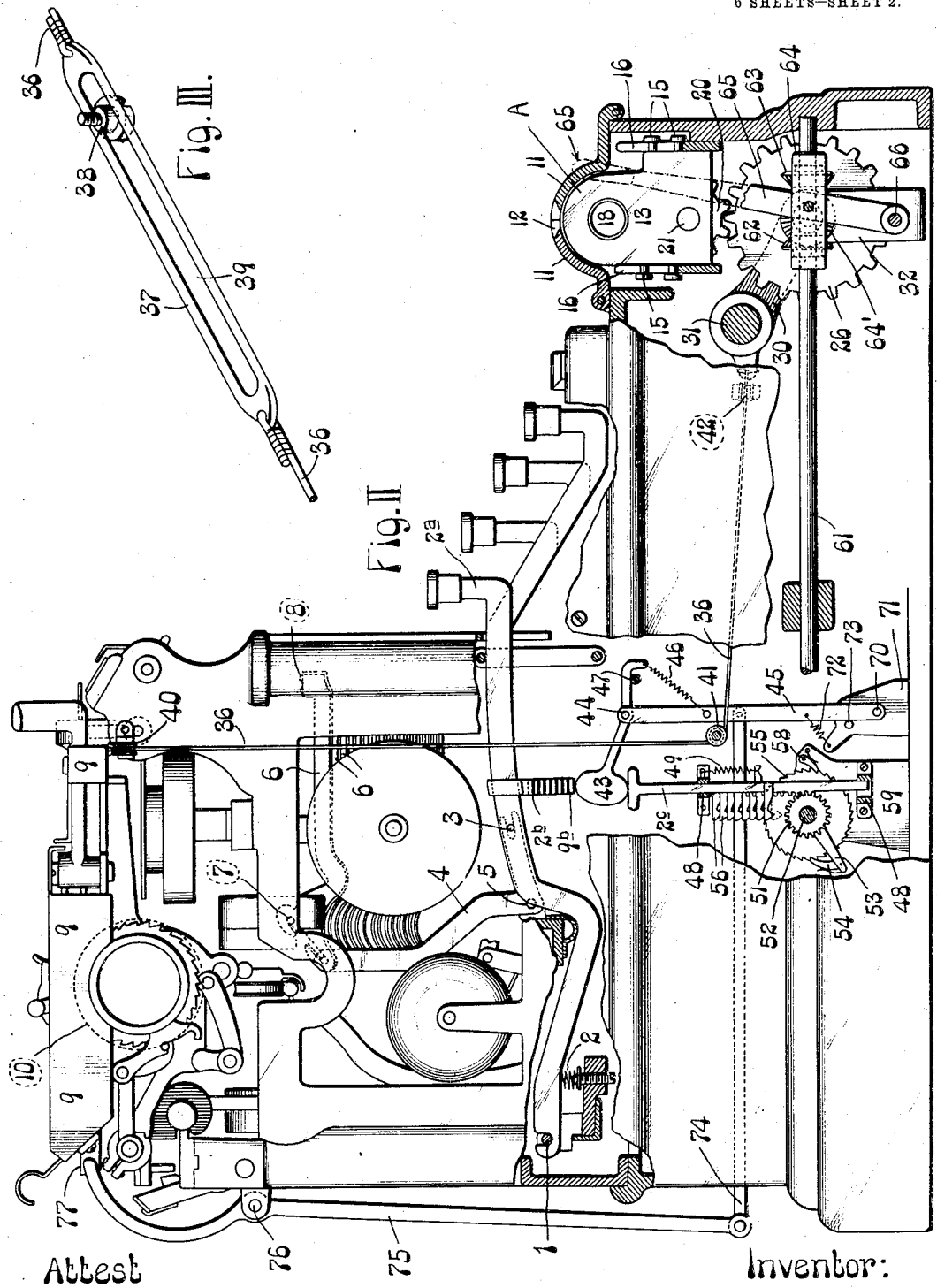

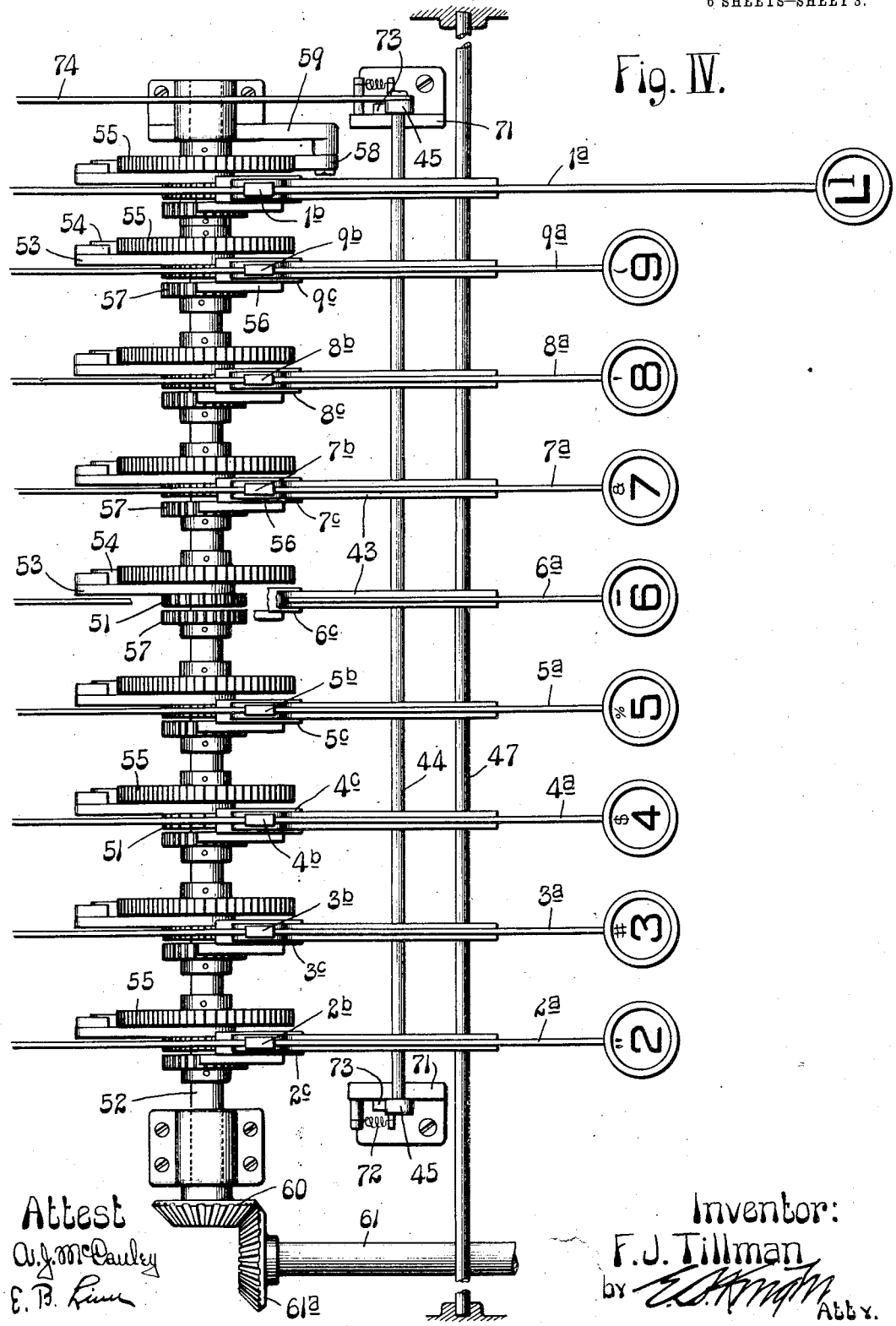

F. J. TILLMAN.
CALCULATING ATTACHMENT FOR TYPE WRITING MACHINES.
APPLICATION FILED AUG. 3, 1910.
1,003,671.
Patented Sept. 19, 1911.
6 SHEETS—SHEET 4.
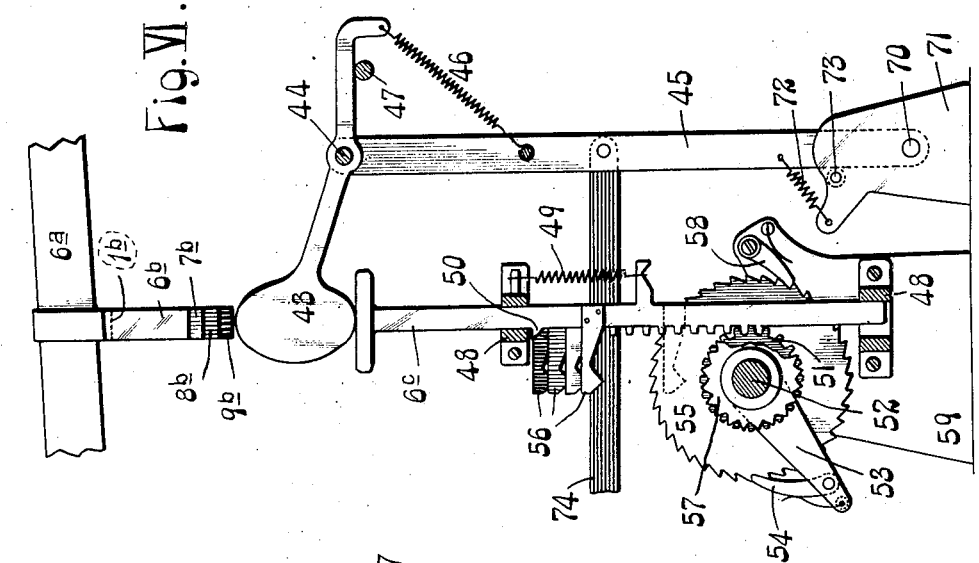
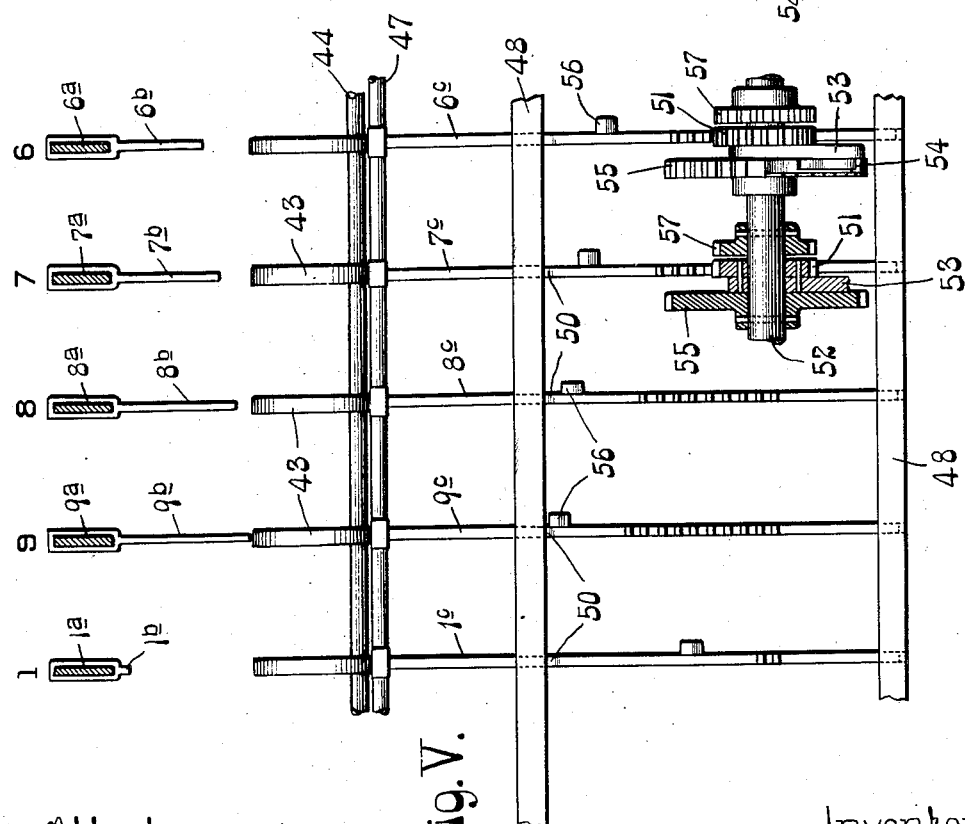
Attest
A. J. McCauley
E. B. Ruu
Inventor:
F. J. Tillman
by E. J. Knight
Atty.

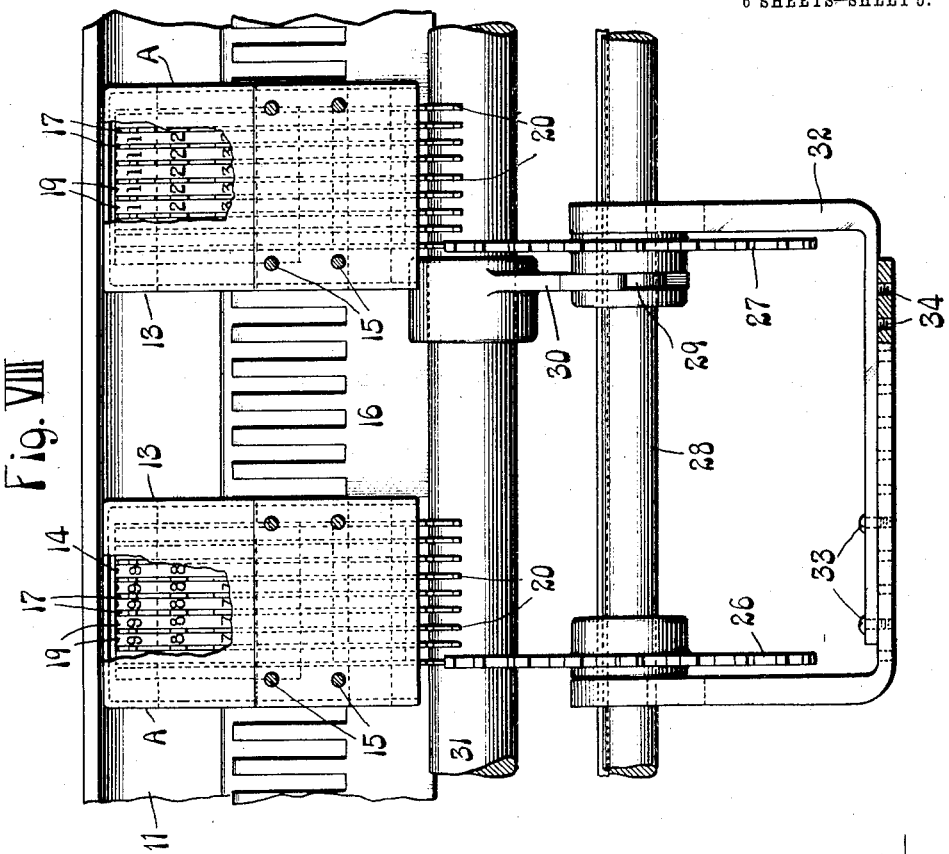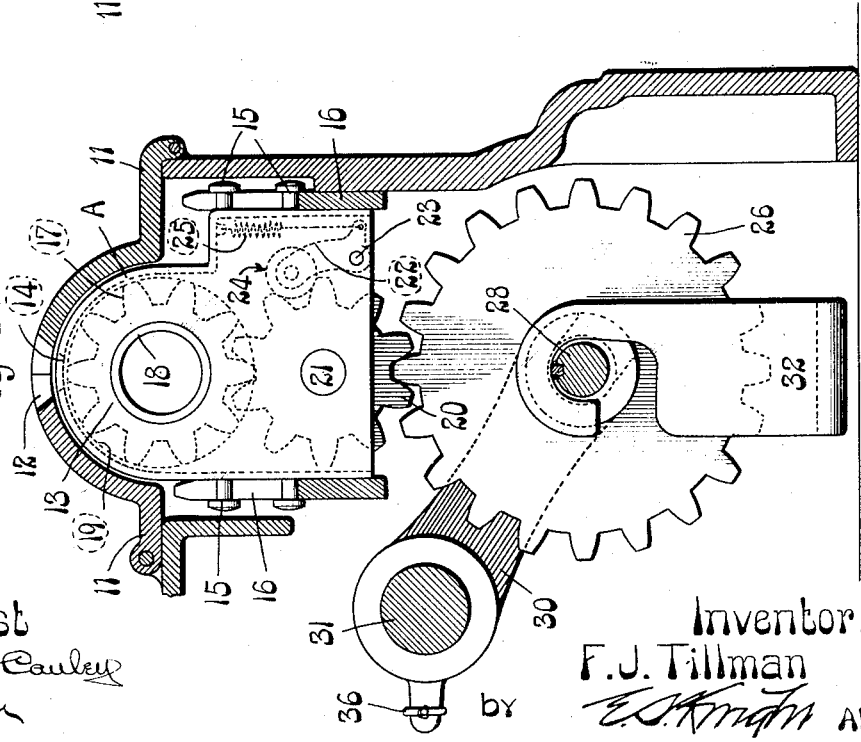

F. J. TILLMAN.
CALCULATING ATTACHMENT FOR TYPE WRITING MACHINES.
APPLICATION FILED AUG. 3, 1910.
1,003,671.
Patented Sept. 19, 1911.
6 SHEETS—SHEET 6.
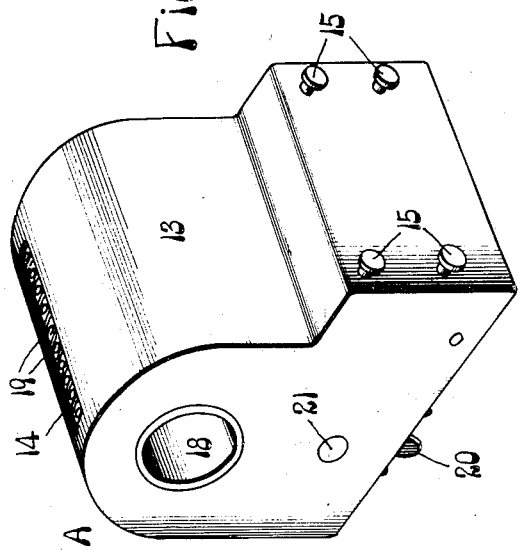
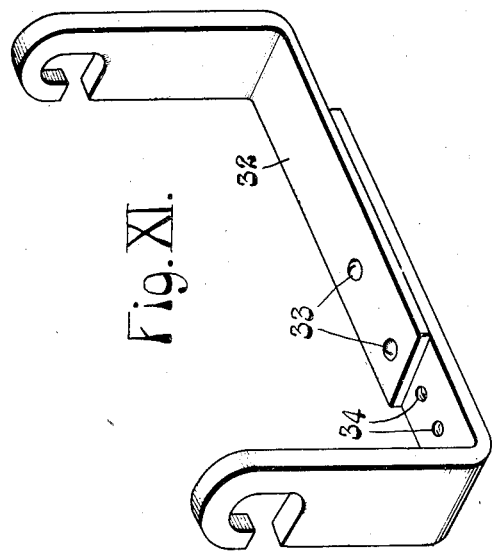
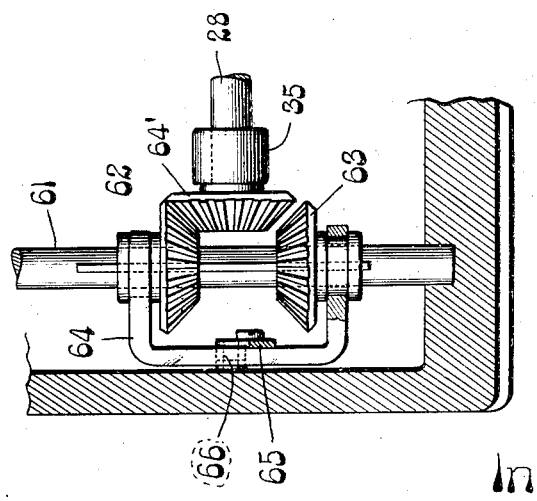
Attest
A. J. McCauley
E. B. Linn
Inventor:
F. J. Tillman
by E. S. Knight
Att'y.

UNITED STATES PATENT OFFICE.

FERDINAND J. TILLMAN, OF ST. LOUIS, MISSOURI.

CALCULATING ATTACHMENT FOR TYPE-WRITING MACHINES.

1,003,671. Specification of Letters Patent. Patented Sept. 19, 1911.

Application filed August 3, 1910. Serial No. 575,247.

*To all whom it may concern:*

Be it known that I, FERDINAND J. TILLMAN, a citizen of the United States of America, residing in the city of St. Louis and State of Missouri, have invented certain new and useful Improvements in Calculating Attachments for Type-Writing Machines, of which the following is a full, clear, and exact description, reference being had to the accompanying drawings, forming part of this specification.

My invention relates to a calculating attachment for use with a typewriting machine of any ordinary construction, having a platen carriage, the attachment comprising mechanism adapted to be placed in operation through the medium of the typewriting machine key levers.

One of the objects of my present invention is the production of an attachment of this character wherein the numeral key levers, which control the calculating mechanism, may be operated at certain times to print numerals without actuating the calculating mechanism.

Another object is the production of a calculating mechanism using a plurality of totalizers, and means for subtracting from one of the totalizers and simultaneously adding in another totalizer.

Other objects, as well as novel details of construction, will hereinafter appear.

Figure I is a top or plan view, partly broken away, of my calculating mechanism and a typewriting machine. Fig. II is a side elevation, partly in section, of the calculating mechanism and machine shown in Fig. I. Fig. III is a perspective view of a portion of the means for connecting the platen carriage to the means for actuating the totalizers. Fig. IV is an enlarged top or plan view of the numeral key levers, and a portion of the calculating mechanism operated by said levers. Fig. V is a rear elevation, partly in section, of a portion of the mechanism shown in Fig. IV. Fig. VI is a side elevation of the parts shown in Fig. V. Fig. VII is an enlarged vertical section taken through the front portion of the machine, and showing a totalizer and means for actuating it. Fig. VIII is an enlarged front elevation of the totalizers and their actuating devices. Fig. IX is a top or plan view, partly in section, of the means for reversing the movement of the totalizers. Fig. X is a perspective view of one of the totalizers. Fig. XI is a perspective view of the connecting device associated with driving wheels that operate the totalizers.

*The typewriting machine.*—The typewriting machine with which I associate my calculating mechanism may be any in which a platen carriage is employed, and inasmuch as my invention is only concerned with certain parts in a typewriting machine that coöperate with my mechanism, I will confine the following description to the features of the typewriting machine shown, which are necessary for the operation of my mechanism in conjunction with this typewriting machine. The typewriting machine shown in the drawings has the usual keyboard and key levers, the latter being pivoted to a rod 1 at the rear end of the machine (see Fig. II) and normally upheld by springs 2. Each key lever is provided with a pin 3 that projects into the bifurcated end of one arm of a bell crank lever 4. The bell crank levers are pivoted at 5 to a suitable support, and connected to type bars 6, pivotally supported at 7, the type bars being provided with numeral type 8.

9 designates a platen carriage supporting a platen 10 and mounted on suitable guides common to typewriting machines. The platen carriage operates step by step during the operation of the typewriting machine, as usual, and a corresponding step by step movement is imparted to a portion of my calculating mechanism by means to be hereinafter described.

*The totalizers.*—A plurality of totalizers A are arranged at the front of my attachment under a pair of hinged covers 11, the adjacent edges of said covers being spaced apart to provide a sight opening 12. Each of these totalizers A has a housing 13 having a sight opening 14 in registration with the sight opening 12. The totalizers are supported on toothed bars 16 extending transversely of the attachment, and the totalizers are provided with studs 15 which fit between the teeth of toothed supporting bars 16 to hold the totalizers in the positions to which they are set. Each totalizer comprises a set of total wheels 17 with numeral disks 19 at their sides (see Figs. VII and VIII). These wheels and disks are rotatably mounted on a transverse shaft 18. During the operation of the calculating mechanism, rotation is imparted to the total wheels 17 by transmission wheels 20 rotatably mounted on a shaft 21 parallel with the shaft 18. To lock these wheels and cause them to stop in their proper positions, a yielding detent arm 22 (see Fig. VII) is located adjacent to each transmission wheel 20. This detent arm is pivotally supported at 23 and a roller 24 mounted in it at its end is yieldingly held between teeth of the wheel 20 by a spring 25.

The totalizer transmission wheels 20 extend below the totalizer housings (see Figs. VII and VIII) and may be driven by either one of two driver wheels 26 and 27, splined to a drive shaft 28 located beneath the totalizers. The driver wheel 27 is provided with a hub having an annular groove 29 (see Fig. VIII) which receives the bifurcated end of a shifter arm 30 loosely mounted on a guide rod 31 parallel with the shaft 28, and said arm is caused to partake of a step by step movement in correspondence with the movement of the typewriting machine platen carriage 9, as will be presently described. This step by step movement of the shifter arm 30 causes the driver wheel 27 to move step by step on the shaft 28, each step being equal to the distance from one of the transmission wheels 20 to the next adjacent transmission wheel 20 of a totalizer, and the driver wheel 27 therefore moves from a wheel 20 to the next wheel 20 upon each stepping movement of the platen carriage incident to the operation of the numeral key levers of the typewriting machine. The driver wheel 26 is caused to step with the wheel 27 by a removable shifting device comprising a frame 32 having hook shaped arms hung on the shaft 28 (see Figs. VII, VIII and IX). The frame 32 is not connected to either of the driver wheels 26 or 27, for the reason that if the wheels and frame were secured together, the wheels 26 and 27 would always step by step in unison, and the shifter arm 30 would be prevented from moving to its starting position at the left-hand side of the mechanism. A bearing 35 (see Fig. I) serves as a stop for the frame 32, and the shifter arm 30 and driver wheel 27 are free to continue moving to the left after the frame engages the bearing. The frame 32 is preferably composed of two sections, adjustably connected by screws 33 passing through one of the sections and adapted to fit any of the apertures 34 in the other section. Adjustment of said frame provides for the driver wheels 26 and 27 being properly spaced apart to mesh with transmission wheels of the two totalizers, when the latter are differently spaced from each other.

I will now describe the means for connecting the shifter arm 30 to the platen carriage so as to impart the step by step movement to said arm and the driver wheels 26 and 27, this means being most clearly shown in Figs. I, II and III.

36 designates cords each having one of its ends connected to a projection on the hub of the shifter arm 30, and its opposite end attached to a connection member 37. The connection member 37 is arranged under the front portion of the platen carriage 9, and is loosely connected thereto by a drag screw 38 which passes through an elongated opening 39 in said member. The cords 36 extend in opposite directions from the ends of the connection member 37, pass through pulleys 40 on the side frames of the typewriter, then downwardly around pulleys 41 and forwardly at the sides of the machine to pulleys 42, from which the cords are deflected inwardly to the arm 30 and secured thereto in any suitable manner.

It will be seen, on referring to Fig. I, that the drag screw 38, secured to the platen carriage, is adapted to engage one end of the connection member 37, and as the platen carriage moves step by step to the left after such engagement, a corresponding movement will be imparted to the cords 36, shifter arm 30, and the driver wheels 26 and 27, said wheels being moved toward the right as the platen carriage moves toward the left. In restoring the platen carriage to its starting position, the cords 36 are not brought into service until the drag screw 38 moves to the right-hand end of the connection member 37, and movement is then imparted to the cords and the parts connected thereto. It will therefore be seen that this construction provides for the drag screw 38 being located at the extreme right-hand end of the connection member when the platen carriage is in starting position, and as the numeral key levers are operated, the carriage, in moving toward the left-hand side of the machine, carries the drag screw 38 with it. During the first portion of the movement of the platen carriage from the right-hand side of the machine, the drag screw travels idly in the connection member 37 until it engages the opposite end of said connection member and exerts a pull upon said member, and consequently causes it to exert a pull upon the cord 36 that serves to move the shifter arm 30 in the proper direction during the performance of a calculating operation.

The object in providing the arrangement just described is to permit of the platen carriage partaking of a certain degree of movement during which printing operation may be carried out on a sheet of paper in the platen carriage, involving the use of numerals, such as printing a date, and without movement being imparted to the elements of the calculating mechanism operable by the cords 36. The main advantage of cutting the cords 36 out of action at the time named, is that by eliminating the movement of the cords, and the parts they are connected to, the platen carriage may be more easily shifted, and further, the elements controlled by the cords are permitted to remain in proximity to the totalizers.

*The power and key controlled mechanism.*—This mechanism provides for the rotation of the shaft 28 and the driver wheels 26 and 27 thereon, in response to the actuation of the numeral key levers of the typewriting machine.

1ª to 9ª, inclusive, are the numeral key levers of the typewriting machine herein shown, and these levers are provided with legs 1ᵇ to 9ᵇ, inclusive.

43 designates rockable levers (see Figs. II, IV, V and VI) arranged under the legs 1ᵇ, etc., said levers being loosely mounted on a rod 44 supported by tiltable posts 45. These levers 43 are normally held in operative position by springs 46, which pull them into engagement with a stop rod 47. Vertically movable rack bars numbered 1ᶜ to 9ᶜ, inclusive, are arranged in guides 48 in vertical alinement with the key lever legs 1ᵇ, etc. Lift springs 49 tend to elevate the rack bars 1ᶜ, etc., and each rack bar is provided with a stop lug 50 which normally engages one of the guides 48 (see Figs. VI and VII).

Upon the operation of any one of the typewriting machine numeral key levers, the rockable lever 43 and rack bar corresponding thereto are depressed with the result of imparting rotation to one of a series of gear wheels 51 on a shaft 52 and in mesh with the said rack bars. As all of the key levers must move different distances, according to their numerical value, the key lever legs 1ᵇ, etc., are made of different lengths to allow said key levers to move different predetermined distances before actuating the rockable levers 43. It will be seen that the leg 1ᵇ controlled by the "1" key is shorter than any other leg, the leg 9ᵇ controlled by the "9" key, the longest, and the remaining legs varying in length between these two according to the numerical value of the keys with which they are associated. Upon depression of the numeral "1" key lever, its leg operates the lever 43 beneath it, thereby causing the rack bar 1ᶜ to move downwardly a distance equal to the distance from the center of one of its teeth to the center of the next adjacent tooth. Depression of the "9" key lever operates the leg 9ᵇ and brings into service nine teeth on the rack bar 9ᶜ operating the meshing gear wheel 51 to the extent of nine teeth. The gear wheels 51 meshing with the rack bars and loosely mounted on the shaft 52 have secured to them arms carrying spring pressed pawls 54 (see Figs. V and VI).

55 are ratchet wheels rigidly secured to the shaft 52, and engaged by the pawls 54. A downward movement of any one of the rack bars 1ᶜ, etc., imparts rotation to the gear wheel 51 in mesh with said rack bar, thereby causing the pawl 54 connected thereto to rotate the adjacent ratchet wheel 55, and as the said ratchet wheel is secured to the shaft 52, it will be seen that this rack bar movement results in rotation of said shaft. The rack bars must move only a predetermined distance upon the operation of the numeral key levers corresponding to them, and to prevent the shaft 52 from rotating after these rack bars have moved the proper degree, I provide the rack bars 1ᶜ, etc., with detent arms 56 for engagement with star wheels 57 fixed to the shaft 52 (see Figs. IV, V and VII) when the rack bars reach the limits of their downward strokes.

To prevent retrograde movement of the shaft 52, while the rack bars are being restored to normal position by the lift springs 49, I employ a spring pressed pawl 58 that engages one of the ratchet wheels 55, this pawl being mounted on a bearing 59 at one end of the shaft 52.

The shaft 52 is provided at one of its ends with a bevel gear wheel 60 meshing with a gear wheel 61ª on a shaft 61 (Figs. I, II and IV) that extends forwardly from the shaft 52. Bevel gear wheels 62 and 63 are splined to the shaft 61 near its forward end and confined by a yoke 64 (Figs. I, II and IX) loosely mounted on said shaft. Either of the wheels 62, 63 may be brought into mesh with a bevel gear wheel 64' on the adjacent end of the shaft 28, by the operation of a hand lever 65. This lever is pivoted to the yoke 64, and has its lower end pivotally supported at 66, said lever being operable to shift the bevel gears 62 and 63 and thereby cause reversal of the direction of rotation of the shaft 28.

It will now be understood that the operation of a numeral key lever will cause a rotary motion to be imparted to the shaft 28 upon which the driver wheels 26 and 27 are slidably mounted.

The totalizer wheels 17 which carry the numeral disks 19 have ten teeth, and the various parts for transmitting the movement of the key levers to these total wheels are proportioned to cause the total wheels to move one-tenth of a revolution upon the operation of the "1" key, two-tenths of a revolution when the "2" key is operated, etc., the "9" key moving these wheels nine-tenths of a revolution. In performing addition the numbers are written in a column on a sheet of paper in the platen carriage by operating the key levers, and during this operation of the levers, the numbers are added in the totalizers.

In printing the character "0", the driver wheels 26 and 27 simply slide one step in unison with the platen carriage without in any way affecting either totalizer, as the numeral key lever of the "0" key of the typewriting machine is not provided with any means to cause operation of the calculating mechanism.

Any suitable carrying mechanism may be used in the totalizers for causing a total wheel, after turning one complete revolution, to operate the next total wheel of higher order.

To reset the total wheels, or restore them to normal position, it is only necessary to operate the hand lever 65, thereby shifting the bevel gears 62, 63 to reverse the direction of rotation of the shaft 28, and thereafter operate the keys to print the total indicated by the totalizer. This operation of the keys will reversely rotate the total wheels and restore them to "0" by subtracting the total from the totalizers.

In performing subtraction, the first step is to set up the minuend in the totalizer, then shift the hand lever 65 to reverse the movement of the totalizers, thereafter operate the numeral key levers to write the subtrahend, and the number then indicated by the totalizer will be the remainder.

The two totalizers shown in Fig. VIII have their numeral disks so arranged that if both totalizers are rotated in the same direction, the amount indicated by one of them will be increased, while the amount indicated by the other will be decreased. One advantage derived from the use of both of these totalizers is that the operator may subtract a number from one of the totalizers and simultaneously add it to the other. For example, if "25" is indicated by one of the totalizers and it is desired to transfer this number to the other totalizer, the first step is to set the hand lever 65 to perform subtraction in the totalizer indicating "25", then depress the "2" and "5" numeral key lever keys; this action will rotate both of the driver wheels 26 and 27 so as to subtract the numeral "25" from the last mentioned totalizer and simultaneously add it to the other totalizer.

The front portion of the frame of the machine is preferably provided with graduations which correspond to the graduations for indicating the position of the platen carriage. These graduations enable the operator to locate the totalizers and the platen carriage in their proper relative positions.

I will next describe the means providing for the numeral key levers being operated when desired without actuating the calculating mechanism. The rockable levers 43 normally interposed between the key lever legs 1ᵇ, etc., and the rack bars 1ᶜ, etc., (see Figs. II and VI) act to transmit the movements of the key levers to the rack bars. The tiltable posts 45 which support the levers 43 are pivoted at 70 to standards 71, and they may be shifted to move the levers 43 out of alinement with the key lever legs, thereby allowing the numeral key levers to operate without imparting movement to the rack bars. Springs 72 connecting the posts 45 to the standards 71 normally hold said posts against stop lugs 73 on said standards. A link 74 is pivoted to one of the bars 45 and has its opposite end pivotally connected to the lever 75 at the rear of the typewriting machine (Figs. I and II). This lever is pivoted at 76 and may be moved to impart a forward movement to the upright bars 45, and thus move the rockable levers 43 away from the key lever legs. The lever 75 is preferably actuated by a cam 77 carried by the platen carriage (see Figs. I and II). When the carriage is moved to the extreme right-hand of the machine, the upper end of the lever 75 moves onto the inclined face 78 of the cam 77 and then onto the straight face 79 on said cam. The key levers may then be operated to move the carriage toward the left, and the upper end of the lever 75 will be held outwardly by the cam 77 for a predetermined length of time during the initial movement of the carriage. The calculating mechanism will therefore be prevented from operating during the initial movement of the platen carriage, while the driver wheels 26 and 27, which actuate the totalizers are prevented, due to the employment of the connection member 37, from stepping in unison with the platen carriage during its initial movement.

I claim:

1. The combination in a calculating machine, of a platen carriage, type bars, numeral key levers for operating said type bars, slidable calculating mechanism members disposed beneath said key levers, and transmission members interposed between said key levers and slidable members adapted to be withdrawn from their normal positions to permit operation of the key levers without operation of the calculating mechanism.

2. The combination in a calculating machine, of a platen carriage, type bars, numeral key levers for operating said type bars, slidable calculating mechanism members disposed beneath said key levers, transmission members normally interposed between said key levers and said slidable members, and means operable by said platen carriage whereby said transmission members are moved to inoperative positions.

3. The combination in a calculating machine, of a platen carriage, type bars, numeral key levers for operating said type bars, slidable calculating mechanism members disposed beneath said key levers, spring controlled transmission members normally held in positions between said key levers and said slidable members, and means operable by said platen carriage whereby said transmission members are moved to inoperative positions.

4. The combination in a calculating machine, of a platen carriage, type bars, numeral key levers for operating said type bars, the numeral key levers being provided with legs, calculating mechanism comprising slidable members, transmission members interposed between the legs of said key levers and said slidable members, and means operable by said platen carriage whereby said transmission members are moved to inoperative positions.

5. The combination in a calculating machine, of a platen carriage, type bars, numeral key levers for operating said type bars, calculating mechanism comprising rack bars located beneath said key levers, transmission members interposed between said key levers and said rack bars, movable supports for said transmission members, and means operable by said platen carriage whereby said support is moved to carry said transmission members to inoperative positions.

6. The combination in a calculating machine, of keys, rack bars operable by said keys, a shaft, gear wheels loosely mounted on said shaft in mesh with said rack bars, ratchet wheels fixed to said shaft, arms fixed to said gear wheels, and pawls carried by said arms adapted to impart rotation to said ratchet wheels and shaft upon movement of said keys, rack bars, and gear wheels.

7. The combination in a calculating machine, of keys, rack bars operable by said keys, a shaft, gear wheels loosely mounted on said shaft in mesh with said rack bars, ratchet wheels fixed to said shaft, arms fixed to said gear wheels, pawls carried by said arms adapted to impart rotation to said ratchet wheels and shaft upon movement of said keys, rack bars, and gear wheels, and means for engagement carried by said rack bars and shaft whereby said ratchet wheels and shaft are prevented from rotating more than a predetermined degree.

8. The combination in a calculating machine, of keys, rack bars operable by said keys, a shaft, gear wheels loosely mounted on said shaft in mesh with said rack bars, ratchet wheels fixed to said shaft, arms fixed to said gear wheels, pawls carried by said arms adapted to impart rotation to said ratchet wheels and shaft upon movement of said keys, rack bars, and gear wheels, toothed wheels fixed to said shaft, and detents carried by said rack bars arranged for engagement with said toothed wheels when said ratchet wheels have been rotated a predetermined degree.

FERDINAND J. TILLMAN.

In the presence of—
H. G. COOK,
E. B. LINN.